United States Patent
Guo et al.

(10) Patent No.: US 10,275,820 B2
(45) Date of Patent: Apr. 30, 2019

(54) SYSTEMS AND METHODS FOR UTILIZING A CONVOLUTIONAL NEURAL NETWORK ARCHITECTURE FOR VISUAL PRODUCT RECOMMENDATIONS

(71) Applicant: WAL-MART STORES, INC., Bentonville, AR (US)

(72) Inventors: Stephen Dean Guo, Saratoga, CA (US); Kannan Achan, Saratoga, CA (US); Venkata Syam Prakash Rapaka, Cupertino, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 80 days.

(21) Appl. No.: 15/420,885

(22) Filed: Jan. 31, 2017

(65) Prior Publication Data
US 2018/0218429 A1    Aug. 2, 2018

(51) Int. Cl.
*G06N 3/08* (2006.01)
*G06Q 30/06* (2012.01)
(Continued)

(52) U.S. Cl.
CPC ..... *G06Q 30/0631* (2013.01); *G06F 17/3053* (2013.01); *G06F 17/30867* (2013.01);
(Continued)

(58) Field of Classification Search
CPC ............ G06Q 30/0631; G06F 17/3053; G06F 17/30867; G06K 9/6215; G06K 9/66; G06N 3/08
See application file for complete search history.

(56) References Cited

U.S. PATENT DOCUMENTS

| | | | |
|---|---|---|---|
| 2009/0225351 A1* | 9/2009 | Lacagnina | H04N 1/00132 |
| | | | 358/1.15 |
| 2016/0140146 A1* | 5/2016 | Wexler | G06F 17/30253 |
| | | | 707/741 |

(Continued)

OTHER PUBLICATIONS

Tao, R., Gavves, E., and Smeulders, A.W.M., "Siamese Instance Search for Tracking," available at https://arxiv.org/abs/1605.05863 May 19, 2016.

(Continued)

*Primary Examiner* — Gregory M Desire
(74) *Attorney, Agent, or Firm* — Bryan Cave Leighton Paisner LLP

(57) ABSTRACT

Systems and methods including one or more processing modules and one or more non-transitory storage modules storing computing instructions configured to run on the one or more processing modules and perform acts of accessing an online catalog for an online retailer comprising a plurality of digital images of a plurality of items for sale by the online retailer, training a two-branch a Siamese convolutional neural network (CNN) model to determine a similarity between two digital images of the plurality of digital images, receiving one or more digital images of a new item for the online catalog, determining, using the two-branch Siamese CNN model and the one or more digital images of the new item, a similar item of the plurality of items to which the new item is most similar, and coordinating a display of the new item on a webpage based on a ranking of the similar item.

20 Claims, 5 Drawing Sheets

(51) Int. Cl.
*G06K 9/66* (2006.01)
*G06K 9/62* (2006.01)
*G06F 17/30* (2006.01)

(52) U.S. Cl.
CPC ............ *G06K 9/6215* (2013.01); *G06K 9/66* (2013.01); *G06N 3/08* (2013.01)

(56) References Cited

U.S. PATENT DOCUMENTS

| | | | |
|---|---|---|---|
| 2017/0124433 A1* | 5/2017 | Chandraker | G06F 17/30247 |
| 2017/0186032 A1* | 6/2017 | Rangasamy Kannadasan | G06Q 30/0248 |
| 2017/0287023 A1* | 10/2017 | Koch | G06Q 30/0601 |
| 2018/0150891 A1* | 5/2018 | Raykar | G06Q 30/0623 |
| 2018/0181569 A1* | 6/2018 | Jarr | G06F 17/3028 |
| 2018/0218429 A1* | 8/2018 | Guo | G06Q 30/0631 |

OTHER PUBLICATIONS

Krizhevsky, A., Sutskever, I., and Hinton, G.E., "ImageNet Classification with Deep Convolutional Neural Networks," available at https://papers.nips.cc/paper/4824-imagenet-classification-with-deep-convolutional-neural-networks 2012.

* cited by examiner

SYSTEMS AND METHODS FOR UTILIZING A CONVOLUTIONAL NEURAL NETWORK ARCHITECTURE FOR VISUAL PRODUCT RECOMMENDATIONS

TECHNICAL FIELD

This disclosure relates generally to utilizing a convolutional neural network architecture for visual product recommendations.

BACKGROUND

Online retailers regularly introduce numerous new items to their websites. A problem of introducing new items with little or no historical feedback data is appropriately recommending the new items on webpages for similar or related items. A traditional system and method for solving this problem includes aggregating behavior of many users to provide recommendations for a particular user. This traditional method, however, does not utilize the content of the new items.

BRIEF DESCRIPTION OF THE DRAWINGS

To facilitate further description of the embodiments, the following drawings are provided in which.

Figure 1:
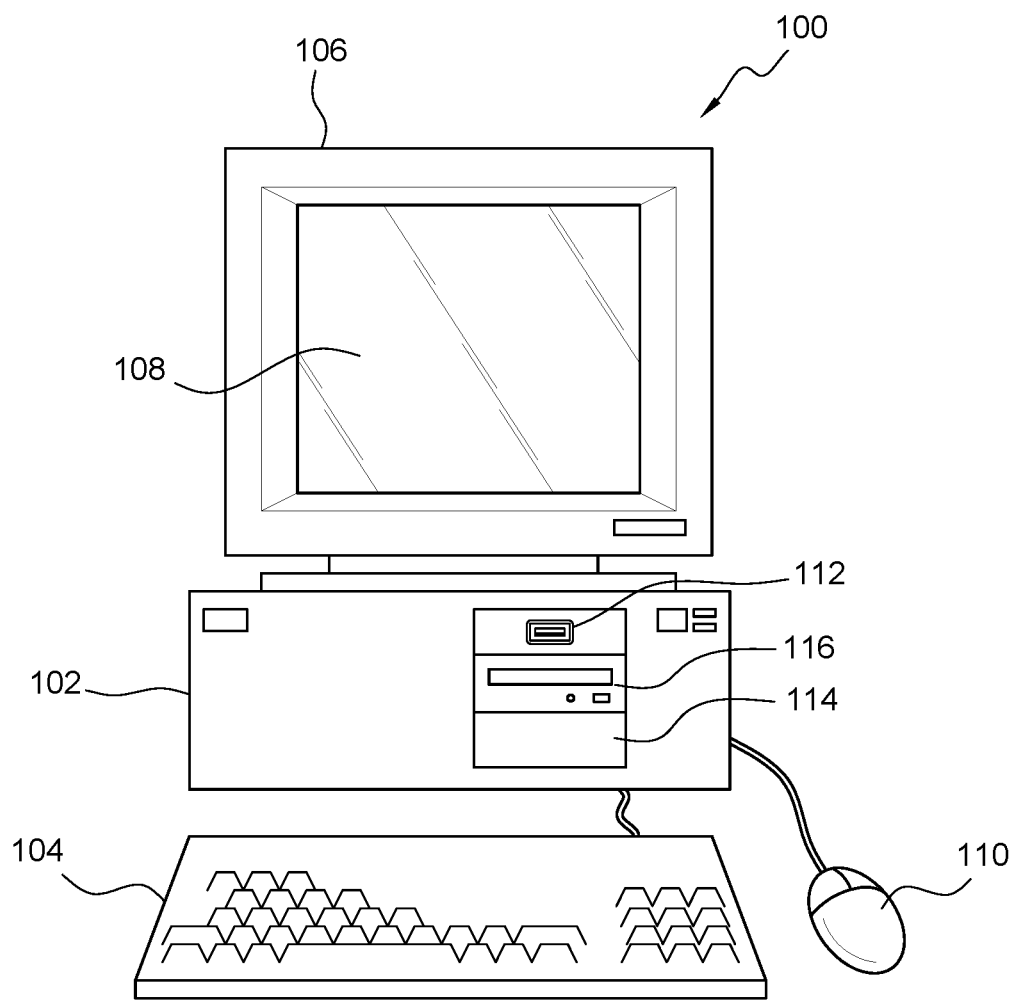
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processing modules and one or more non-transitory storage modules storing computing instructions configured to run on the one or more processing modules. The one or more storage modules can be configured to run on the one or more processing modules and perform an act of accessing an online catalog for an online retailer, the catalog comprising a plurality of digital images of a plurality of items for sale by the online retailer. The one or more storage modules also can be configured to run on the one or more processing modules and perform an act of training a two-branch a Siamese convolutional neural network (CNN) model, using the plurality of digital images and user session data from a plurality of users of the online catalog, to determine a similarity between two digital images of the plurality of digital images. The one or more storage modules can be configured to run on the one or more processing modules and perform an act of receiving one or more digital images of a new item for the online catalog. The one or more storage modules can be configured to run on the one or more processing modules and perform an act of determining, using the two-branch Siamese CNN model and the one or more digital images of the new item, at least one similar item of the plurality of items to which the new item is most similar. The one or more storage modules can be configured to run on the one or more processing modules and perform an act of coordinating a display of the new item on a webpage based on a ranking of the least one similar item.

Various embodiments include a method. The method can include accessing an online catalog for an online retailer, the catalog comprising a plurality of digital images of a plurality of items for sale by the online retailer. The method also can include training a two-branch a Siamese CNN model, using the plurality of digital images and user session data from a plurality of users of the online catalog, to determine a similarity between two digital images of the plurality of digital images. The method also can include receiving one or more digital images of a new item for the online catalog. The method also can include determining, using the two-branch Siamese CNN model and the one or more digital images of the new item, at least one similar item of the plurality of items to which the new item is most similar. The method also can include coordinating a display of the new item on a webpage based on a ranking of the least one similar item.

Figure 2:
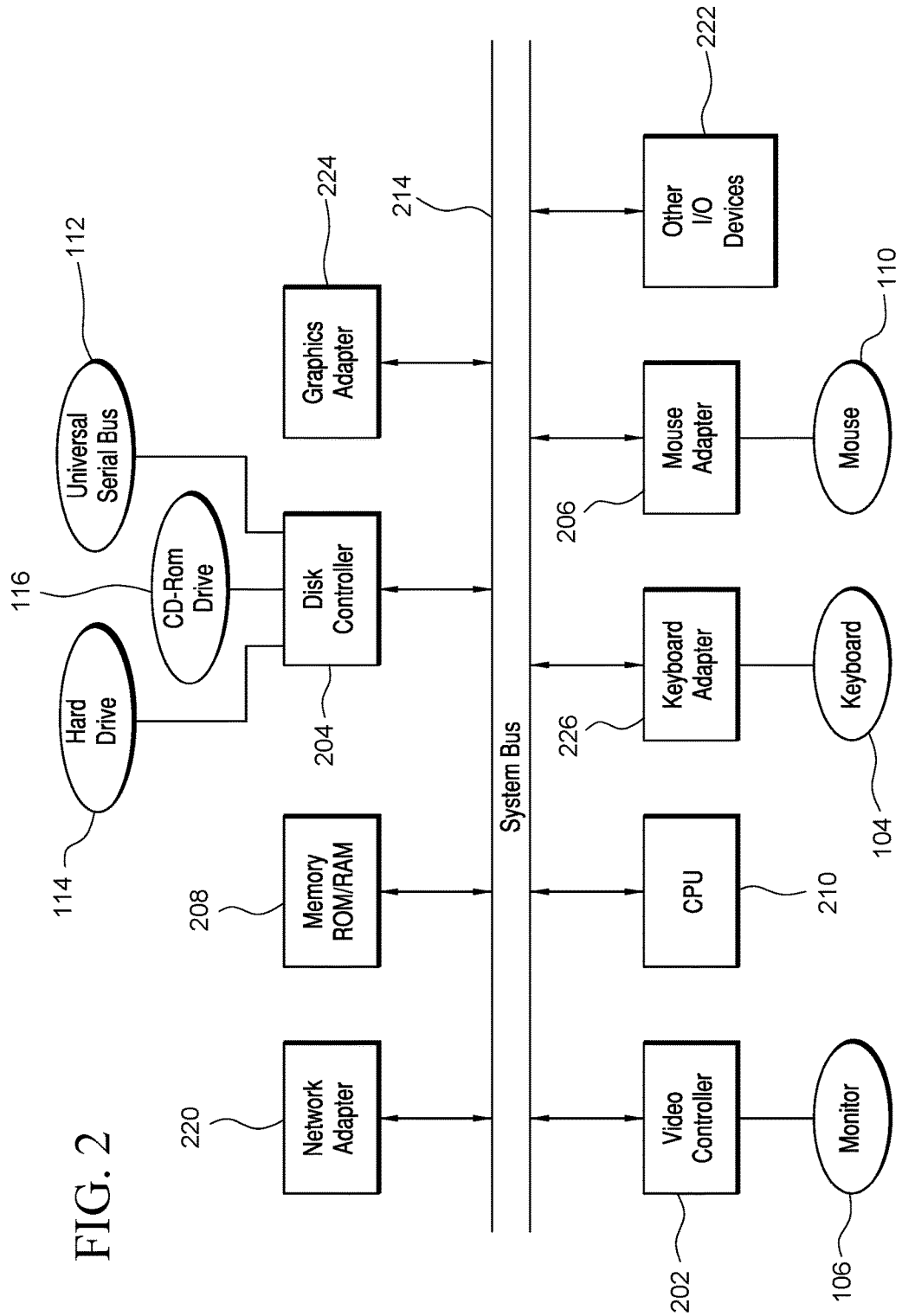
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile (e.g., non-transitory) memory, such as, for example, read only memory (ROM) and/or (ii) volatile (e.g., transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), a CD-ROM and/or DVD for use with CD-ROM and/or DVD drive 116 (FIGS. 1-2), a floppy disk for use with a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
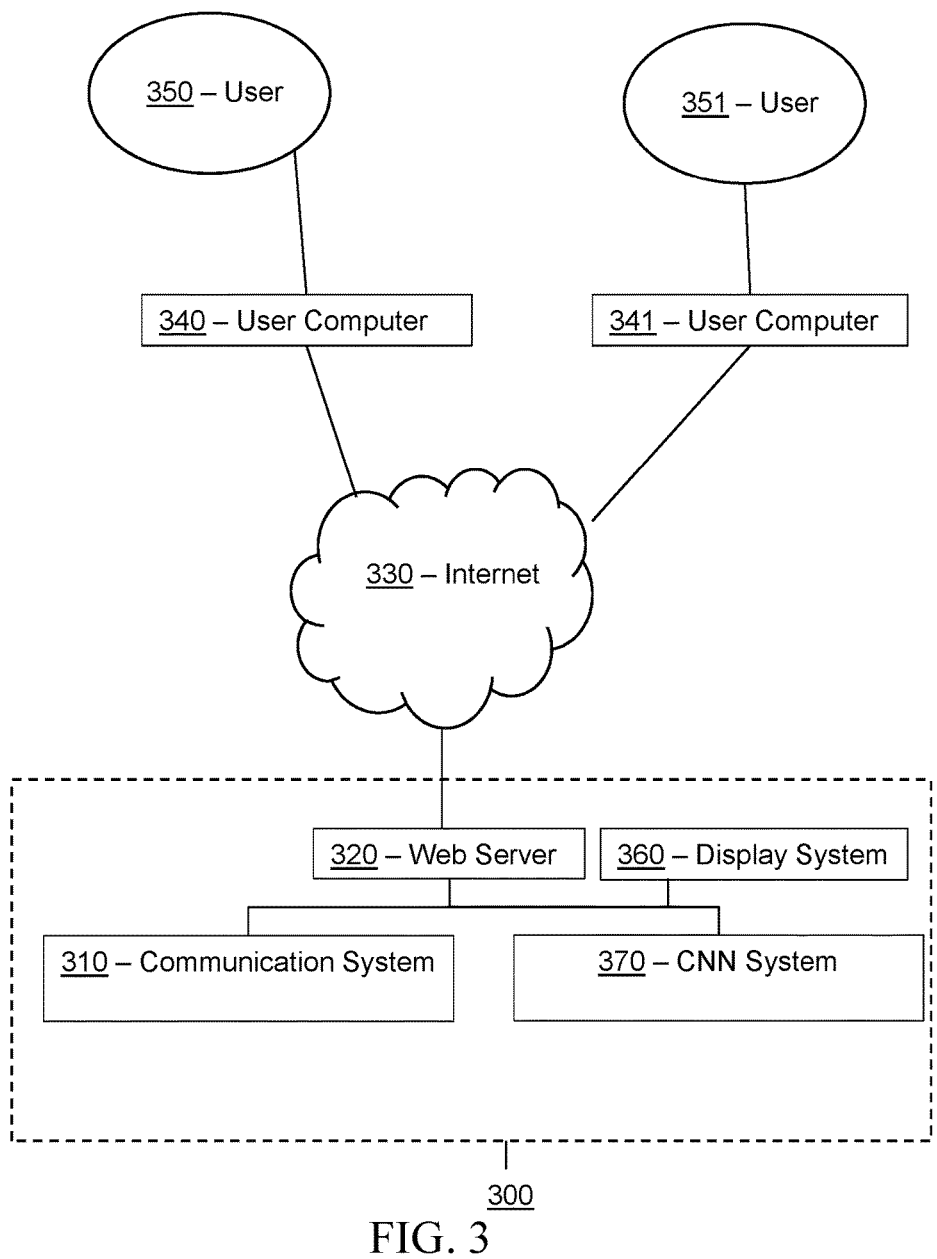
FIG. 3 illustrates a representative block diagram of a system, according to an embodiment.

Turning ahead in the drawings, FIG. 3 illustrates a block diagram of a system 300 that can be employed for utilizing a CNN architecture for visual product recommendations, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a communication system 310, a web server 320, a display system 360, and/or a CNN system 370. Communication system 310, web server 320, display system 360, and/or CNN system 370 can each be a computer system, such as computer system 100 (FIG. 1), as described above, and can each be a single computer, a single server, or a cluster or collection of computers or servers, or a cloud of computers or servers. In another embodiment, a single computer system can host each of two or more of communication system 310, web server 320, display system 360, and/or CNN system 370. Additional details regarding communication system 310, web server 320, display system 360, and CNN system 370 are described herein.

In many embodiments, system 300 also can comprise user computers 340, 341. In some embodiments, user computers 340, 341 can be a mobile device. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, communication system 310, web server 320, display system 360, and/or CNN system 370 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) communication system 310, web server 320, display system 360, and/or CNN system 370 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of communication system 310, web server 320, display system 360, and/or CNN system 370. In a similar manner, the processing module(s) and the memory storage module(s) can be local and/or remote to each other.

In many embodiments, communication system 310, web server 320, display system 360, and/or CNN system 370 can be configured to communicate with one or more user computers 340 and 341. In some embodiments, user computers 340 and 341 also can be referred to as customer computers. In some embodiments, communication system 310, web server 320, display system 360, and/or CNN system 370 can communicate or interface (e.g., interact) with one or more customer computers (such as user computers 340 and 341) through a network or internet 330. Internet 330 can be an intranet that is not open to the public. Accordingly, in many embodiments, communication system 310, web server 320, display system 360, and/or CNN system 370 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as customers, in which case, user computers 340 and 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, communication system 310, web server 320, display system 360, and/or CNN system 370 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between communication system 310, web server 320, display system 360, CNN system 370, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Online retailers regularly introduce numerous new items to their websites. A problem of introducing new items with little or no historical feedback data is appropriately recommending the new items on webpages for similar or related items. A traditional system and method for solving this problem includes aggregating behavior of many users to provide recommendations for a particular user. This method, however, does not utilize the content of the new items. Systems and methods of this disclosure solve this problem through a deep learning network for performing image retrieval and image similarity for a large collection of images, such as but not limited tens of millions of images common to large online retailers. This deep learning network can be naturally extensible for integration of item attributes to determine item similarity between pairs of items.

Figure 4:
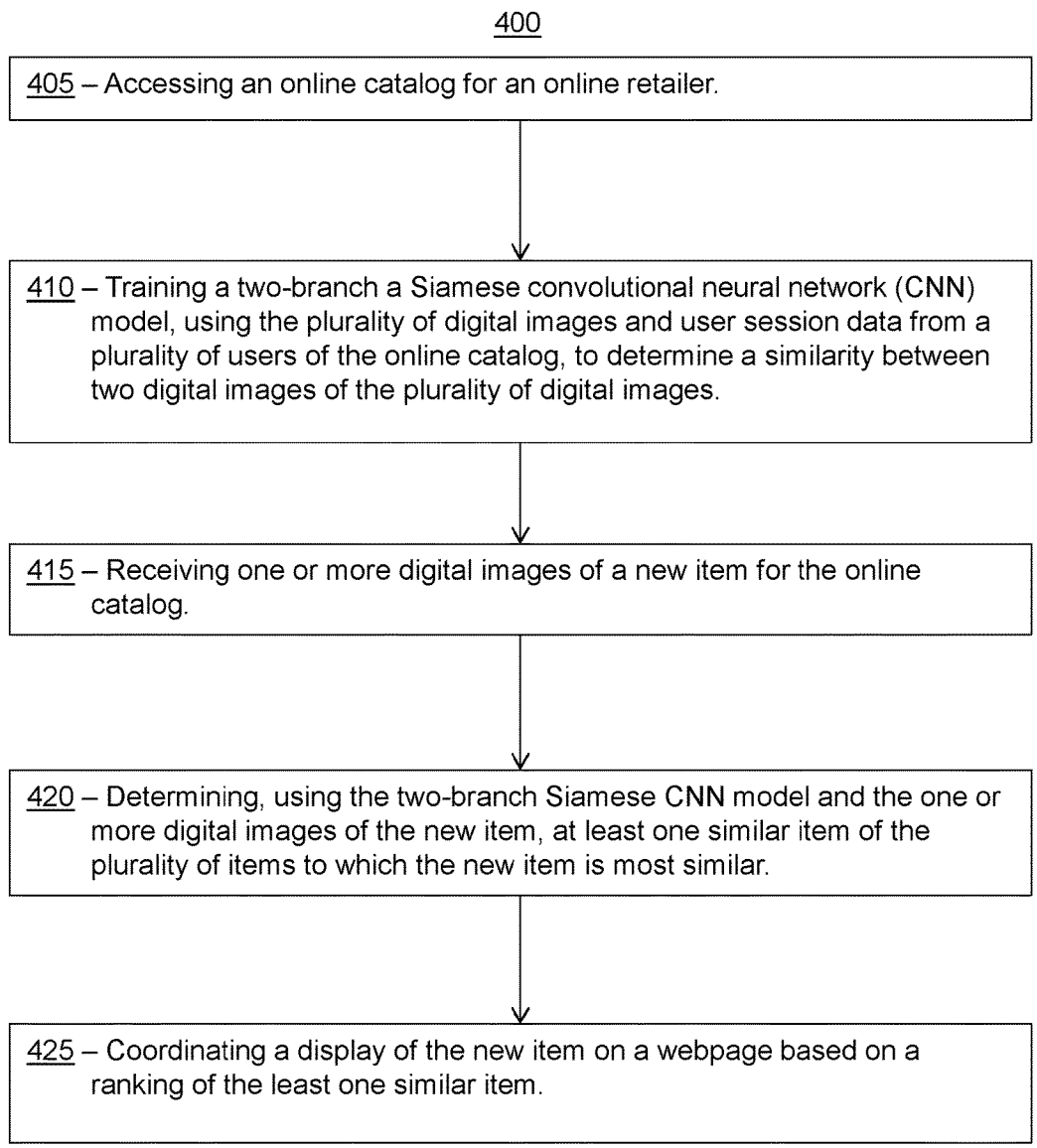
FIG. 4 is a flowchart for a method, according to certain embodiments.
Figure 5:
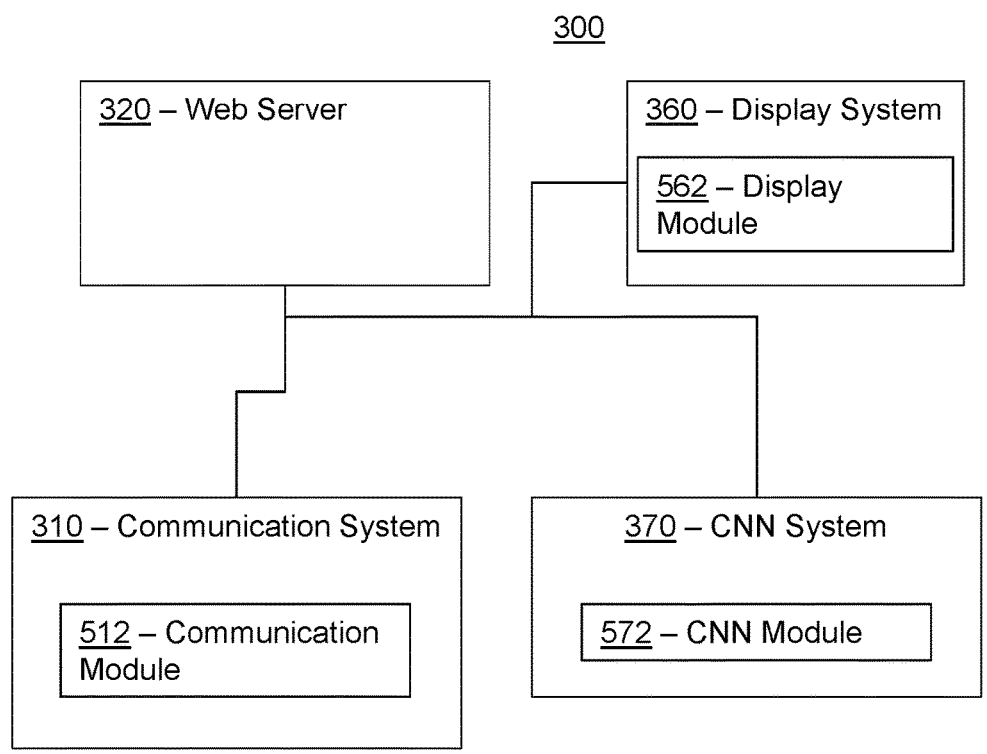
FIG. 5 illustrates a representative block diagram of a portion of the system of FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 512, 562, and/or 572 (FIG. 5). Such non-transitory memory storage modules can be part of a computer system such as communication system 310, web server 320, display system 360, and/or CNN system 370 (FIGS. 3 & 5). The processing module(s) can be similar or identical to the processing module(s) described above with respect to computer system 100 (FIG. 1).

Method 400 can comprise an activity 405 of accessing an online catalog for an online retailer. While reference is made to an online catalog for an online retailer, it is contemplated that the activity 405 also can comprise accessing an electronic catalog for a brick and mortar retailer and/or accessing an online catalog for a brick and mortar retailer. Furthermore, the online retailer can have brick and mortar stores. The catalog for the online retailer can comprise a plurality of digital images of a plurality of items for sale by the online retailer. More particularly, the catalog of the online retailer can comprise one or more digital images for each item of the plurality of items currently on sale, previously on sale, or expected to be on sale in the future by the online retailer.

In some embodiments, activity 405 can comprise using a distributed network comprising distributed memory architecture to access or receive an online catalog for an online retailer. This distributed architecture can reduce the impact on the network and system resources to reduce congestion in bottlenecks while still allowing data to be accessible from a central location. In some embodiments accessing the online catalog is performed while a user is shopping on a website of the online retailer, e.g., when a user enters a search query, browses categories of products, and/or sorts products. In some embodiments, accessing the catalog is performed when system 300 (FIG. 3) receives new items and/or on a daily or weekly basis.

In many embodiments, system 300 (FIG. 3) can include a deep learning network for performing image retrieval and determination of image similarity for a large collection of digital images. The deep learning network can be extendible to one or more other similarities of item attributes between different items. In some embodiments, a Siamese CNN model can be used to perform the image retrieval and determination of image similarity. Training data for the Siamese CNN model can comprise pairwise labels generated via taxonomy distance and/or session action features, as described in greater detail below.

Returning to FIG. 4, method 400 also can comprise an activity 410 of training a two-branch a Siamese CNN model, using the plurality of digital images and user session data from a plurality of users of the online catalog, to determine a similarity between two digital images of the plurality of digital images. The user session data can comprise one or more content-based features and one or more feedback-based features. Content-based features can comprise item attributes, item images, and text describing the item. Feedback-based features can comprise historical user-item actions.

In some embodiments, each branch of the two-branch Siamese CNN model can comprise a plurality of layers that transform each digital image of the plurality of digital images into a 100-dimensional or other n-dimensional vector. Each layer of the plurality of layers receives the output of a previous layer, performs a mathematical computation (depending upon the definition of the layer), then passes the output for that layer to the next layer as input for the next layer. The plurality of layers of each branch of the two-branch Siamese CNN model can comprise, in order of application to the input: a first convolutional layer, a first maximum pool layer, a first normalization layer, a second convolutional layer, a second maximum pool layer, a second normalization layer, a third convolutional layer, a fourth convolutional layer, a fifth convolutional layer, a first fully connected layer, a second fully connected layer, a third fully connected layer, a dropout layer, a rectified linear unit layer, and a fourth fully connected layer. In this example, the fourth fully connected layer can output the 100-dimensional or other n-dimensional vector for a digital image. In some embodiments, the first convolutional layer can use 96 11×11 filters with stride 4, the first maximum pool layer can use 3×3 filters with stride 2, the second convolutional layer can use 256 5×5 filters with stride 1, the second maximum pool layer can use 3×3 filters with stride 1, the third convolutional layer can use 384 3×3 filters with stride 1, the fourth convolutional layer can use 384 3×3 filters with stride 1, and/or the fifth convolutional layer can use 256 3×3 filters with stride 1.

In some embodiments, an input for the two-branch Siamese CNN model can comprise a pair of digital images from the plurality of digital images, and an output of the two-branch Siamese CNN model can comprise a number indicating the similarity of the pair of digital images. More particularly, the number indicating the similarity of the pair of digital images can comprise a contrastive loss of each pair of digital images input into the CNN model. Determination of the contrastive loss of each pair of digital images is described in greater detail below.

In many embodiments, training the two-branch Siamese CNN model can comprise an activity of inputting a plurality of pairs of digital images of the plurality of digital images into the two-branch Siamese CNN model. Each pair of the plurality of pairs of digital images can be labeled as similar or dissimilar before being input into the two-branch Siamese CNN model. Training the two-branch Siamese CNN model also can comprise an activity of determining a distance between the 100-dimensional vector (or other n-dimensional vector) of each digital image of each pair of the plurality of pairs of digital images. Training the two-branch Siamese CNN model also can comprise an activity of determining the contrastive loss for each pair of the plurality of pairs of digital images using a first set of rules.

As noted above, the contrastive loss can comprise the number indicating the similarity of the pair of digital images. In some embodiments, the number of the contrastive loss can be between zero and infinity. By way of non-limiting example, the closer the number of the contrastive loss is to zero, the closer in similarity the pair of images are. The first set of rules for determining the contrastive loss of each pair of the plurality of pairs of digital images can comprise:

$$L(\theta) = \Sigma_{(x_p, x_q)} L_2(x_p, x_q)^2 + \Sigma_{(x_m, x_n)} (\mathrm{margin} - L_2(x_m, x_n))^2$$

where $L(\theta)$ is the contrastive loss, $\Sigma_{(x_p, x_q)} L_2(x_p, x_q)^2$ is a first penalty for one or more first pairs of digital images $x_p$ and $x_q$ of the plurality of pairs of digital images labeled as similar but determined by the two-branch CNN model to be dissimilar, $\Sigma_{(x_m, x_n)} (\mathrm{margin} - L_2(x_m, x_n))^2$ is a second penalty for one or more second pairs of digital images $x_m$ and $x_n$ of the plurality of digital images labeled as dissimilar but determined by the two-branch CNN model to be similar, margin is 1, and $L_2$ is a Euclidian distance. In some embodiments, system 300 (FIG. 3) can determine the contrastive loss given a $L_2$ distance between a first vector for a first image and a second vector of a second image. System 300 also can comprise a true binary label for the pair of images, such as 0 for similar images and 1 for dissimilar images.

Returning to FIG. 4, method 400 also can comprise an activity 415 of receiving or otherwise accessing one or more digital images of a new item for the online catalog. The new item can comprise an item that has little or no historical feedback data on the website of the online retailer. In some embodiments, the new item can comprise an item that has been available for purchase for a period of time, but for which there is little or no historical feedback data. The new item can be referred to as a "cold-start" item because there is little or no historical feedback data. In some embodiments, activity 415 can comprise an activity of using a distributed network comprising distributed memory architecture to access or receive a plurality of new images for a plurality of new items. This distributed architecture can reduce the impact on the network and system resources to reduce congestion in bottlenecks while still allowing data to be accessible from a central location. In some embodiments receiving the one or more digital images is performed while a user is shopping on a website of the online retailer, e.g., when a user enters a search query, browses categories of products, and/or sorts products. In some embodiments, receiving the one or more digital images is performed when system 300 (FIG. 3) receives new items and/or on a daily or weekly basis.

Once the CNN model has been trained, the CNN model can be used to determining one or more new items with no historical feedback data that can be recommended as similar items to previously existing items of the plurality of items. Continuing with FIG. 4, method 400 also can comprise an activity 420 of determining, using the two-branch Siamese CNN model and the one or more digital images of the new item, at least one similar item of the plurality of items to which the new item is most similar.

Determining the at least one similar item of the plurality of items to which the new item is most similar can comprise a plurality of activities in some embodiments. For example, determining the at least one similar item of the plurality of items to which the new item is most similar can comprise an activity of inputting a duplicate pair of digital images of the new item into the two-branch Siamese CNN model. In some embodiments, a duplicate pair of images of the new item is used because the model accepts a pair of images. Determining the at least one similar item of the plurality of items to which the new item is most similar also can comprise an activity of transforming each of the duplicate pair of digital images of the new item into a new 100-dimensional vector using the two-branch Siamese CNN model. For example, the plurality of layers described above can transform a digital image of the new item into a new 100-dimension vector for the new item.

Determining the at least one similar item of the plurality of items to which the new item is most similar also can comprise an activity of comparing the new 100-dimensional vector of the new item to at least a portion of the 100-dimensional vectors of the plurality of digital images. In some embodiments, the 100-dimensional vector of each of the plurality of digital images can be indexed, and system 300 (FIG. 3) can determine one or more 100-dimensional vectors of one or more digital images associated with one or more items of the plurality of items that are closest to the 100-dimensional vector of the new digital image of the new item. Determining the at least one similar item of the plurality of items to which the new item is most similar also can comprise an activity of determining the at least one similar item of the plurality of items comprises at least one 100-dimensional vector most similar to the new 100-dimensional vector of the new item.

Returning to FIG. 4, method 400 also can comprise an activity 425 of coordinating a display of the new item on a webpage based on a ranking of the least one similar item. For example, for a particular user on a particular item webpage, system 300 can coordinate a ranked list of products to put in a carousel on the item webpage. In some embodiments, the ranking of the new item on the webpage of search results is based on the ranking of the at least one similar item that has ranking data. Without training and use of the CNN model, such a ranking of the new item would not be possible because the new item does not have enough historical feedback data to have a reliable ranking.

In many embodiments, the CNN model also can be utilized for other purposes in addition to determining item similarity between new items and other items with historical feedback data. For example, in some embodiments, the CNN model can be used in an ensemble methodology that combines image similarity with content-based features and feedback-based features to determine improved item recommendations. Content-based features can comprise item attributes, item images, and text describing the item. Feedback-based features can comprise historical user-item actions. Other features also may be combined with the image similarity determine with the CNN model, such as but not limited to seller features in metadata and real-time session features. For example, in some embodiments, system 300 (FIG. 3) can comprise a re-ranking (post-processing) layer that operates on the output from the CNN model. This re-ranking can insure that image similarity is properly blended with any available features about the marketplace vendor and/or the brand. By way of a more detailed example, two items may be very similar, but if a first item of the two items is from an unpopular seller, the first item of the two will get discounted by the post processing logic.

In particular embodiments, method 400 further can comprise an activity of combining the similarity between two digital images of the plurality of digital images with one or more content-based features and one or more feedback-based features to determine at least one additional similar item of the plurality of items similar to an additional item of the of the plurality of items. Once the similarity and the features are combined to determine at least one additional similar item, method 400 can comprise an activity of coordinating a display of the additional item on the webpage based on a ranking of the at least one additional item. For example, for a particular user on a particular item webpage, system 300 can coordinate a ranked list of products to put in a carousel on the item webpage.

In many embodiments, the activity of combining the similarity between two digital images of the plurality of digital images with one or more content-based features and one or more feedback-based features can comprise multiple activities. For example, the activity of combining the similarity between the digital images with other features can comprise an activity indexing each 100-dimensional vector of the plurality of digital images onto an index. The activity of combining the similarity between the digital images with other features further can comprise an activity of determining that the 100-dimensional vector of one or more digital images of the plurality of digital images is within a predetermined distance on the index of the 100-dimensional vector of a digital image of the plurality of digital images associated with a particular item of the plurality of items.

Moreover, the activity of combining the similarity between the digital images with other features further can comprise an activity of constraining the particular item with each item of the plurality of items associated with the one or more digital images of the plurality of digital images within the predetermined distance on the index to form one or more constrained pairs. The activity of combining the similarity between the digital images with other features also can comprise activities of accessing user session data for a predetermined period of time relating to each of the one or more constrained pairs, creating training data using the user session data for the predetermined period of time relating to each of the one or more constrained pairs, and inserting the training data into an item ranking model configured to rank one or more items of the plurality of items related to the particular item. The item ranking model can comprise any item ranking model for use in ranking recommended items.

FIG. 5 illustrates a block diagram of a portion of system 300 comprising communication system 310, web server 320, display system 360, and CNN system 370, according to the embodiment shown in FIG. 3. Each of communication system 310, web server 320, display system 360, and/or CNN system 370 is merely exemplary and not limited to the embodiments presented herein. Each of communication system 310, web server 320, display system 360, and/or CNN system 370 can be employed in many different embodiments or examples not specifically depicted or described herein. In some embodiments, certain elements or modules of communication system 310, web server 320, display system 360, and/or CNN system 370 can perform various procedures, processes, and/or acts. In other embodiments, the procedures, processes, and/or acts can be performed by other suitable elements or modules.

In many embodiments, communication system 310 can comprise non-transitory storage module 512. Memory storage module 512 can be referred to as communication module 512. In many embodiments, communication module 512 can store computing instructions configured to run on one or more processing modules and perform one or more acts of method 400 (FIG. 4) (e.g., activity 405 of accessing an online catalog for an online retailer and activity 415 of receiving one or more digital images of a new item for the online catalog (FIG. 4)).

In many embodiments, display system 360 can comprise non-transitory storage module 562. Memory storage module 562 can be referred to as display module 562. In many embodiments, display module 562 can store computing instructions configured to run on one or more processing modules and perform one or more acts of method 400 (FIG. 4) (e.g., activity 425 of coordinating a display of the new item on a webpage based on a ranking of the least one similar item (FIG. 4)).

In many embodiments, CNN system 370 can comprise non-transitory storage module 572. Memory storage module 572 can be referred to as CNN module 572. In many embodiments, CNN module 572 can store computing instructions configured to run on one or more processing modules and perform one or more acts of method 400 (FIG. 4) (e.g., activity 410 of training a two-branch a Siamese CNN model, using the plurality of digital images and user session data from a plurality of users of the online catalog, to determine a similarity between two digital images of the plurality of digital images, and activity 420 of determining, using the two-branch Siamese CNN model and the one or more digital images of the new item, at least one similar item of the plurality of items to which the new item is most similar (FIG. 4)).

Although systems and methods for utilizing a CNN architecture for visual product recommendations have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory storage devices storing computing instructions configured to run on the one or more processors and perform acts of:
accessing an online catalog for an online retailer, the online catalog comprising a plurality of digital images of a plurality of items for sale by the online retailer;
training a two-branch Siamese convolutional neural network (CNN) model, using the plurality of digital images and user session data from a plurality of users of the online catalog, to determine a similarity between two digital images of the plurality of digital images;
receiving one or more digital images of a new item for the online catalog;
determining, using the two-branch Siamese CNN model and the one or more digital images of the new item, at least one similar item of the plurality of items to which the new item is most similar; and
coordinating a display of the new item on a webpage based on a ranking of the at least one similar item,
wherein:
each branch of the two-branch Siamese CNN model comprises a plurality of layers that transform each digital image of the plurality of digital images into a 100-dimensional vector; and
training the two-branch Siamese CNN model comprises:
inputting a plurality of pairs of digital images of the plurality of digital images into the two-branch Siamese CNN model, each pair of the plurality of pairs of digital images being labeled as similar or dissimilar before being input into the two-branch Siamese CNN model;
determining a distance between the 100-dimensional vector of each digital image of each pair of the plurality of pairs of digital images; and
determining a contrastive loss for each pair of the plurality of pairs of digital images using a first set of rules, the contrastive loss comprising a number indicating the similarity of a pair of digital images.

2. The system of claim 1, wherein:
an input for the two-branch Siamese CNN model comprises the pair of digital images from the plurality of digital images; and
an output of the two-branch Siamese CNN model comprises the number indicating the similarity of the pair of digital images.

3. The system of claim 2, wherein the plurality of layers of each branch of the two-branch Siamese CNN model comprise, in order of application to the input: a first convolutional layer, a first maximum pool layer, a first normalization layer, a second convolutional layer, a second maximum pool layer, a second normalization layer, a third convolutional layer, a fourth convolutional layer, a fifth convolutional layer, a first fully connected layer, a second fully connected layer, a third fully connected layer, a dropout layer, a rectified linear unit layer, and a fourth fully connected layer.

4. The system of claim 1, wherein the first set of rules for determining the contrastive loss of each pair of the plurality of pairs of digital images comprise:

$$L(\theta) = \Sigma_{(x_p, x_q)} L_2(x_p, x_q)^2 + \Sigma_{(x_m, x_n)} (\text{margin} - L_2(x_m, x_n))^2$$

where $L(\theta)$ is the contrastive loss, $\Sigma_{(x_p, x_q)} L_2(x_p, x_q)^2$ is a first penalty for one or more first pairs of digital images $x_p$ and $x_q$ of the plurality of pairs of digital images labeled as similar but determined by the two-branch Siamese CNN model to be dissimilar, $\Sigma_{(x_m, x_n)} (\text{margin} - L_2(x_m, x_n))^2$ is a second penalty for one or more second pairs of digital images $x_m$ and $x_n$ of the plurality of digital images labeled as dissimilar but determined by the two-branch Siamese CNN model to be similar, margin is 1, and $L_2$ is a Euclidian distance.

5. The system of claim 1, wherein the one or more non-transitory storage devices storing the computing instructions are further configured to run on the one or more processors and perform acts of:
  combining the similarity between the two digital images of the plurality of digital images with one or more content-based features and one or more feedback-based features to determine at least one additional similar item of the plurality of items similar to an additional item of the plurality of items; and
  coordinating a display of the additional item on the webpage based on a ranking of the at least one additional similar item.

6. The system of claim 5, wherein combining the similarity between two digital images of the plurality of digital images with the one or more content-based features and the one or more feedback-based features comprises:
  indexing each 100-dimensional vector of the plurality of digital images onto an index;
  determining that the 100-dimensional vector of one or more digital images of the plurality of digital images is within a predetermined distance on the index of the 100-dimensional vector of a digital image of the plurality of digital images associated with a particular item of the plurality of items;
  constraining the particular item with each item of the plurality of items associated with the one or more digital images of the plurality of digital images within the predetermined distance on the index to form one or more constrained pairs;
  accessing additional user session data for a predetermined period of time relating to each of the one or more constrained pairs, the additional user session data comprising the one or more content-based features and the one or more feedback-based features;
  creating training data using the additional user session data for the predetermined period of time relating to each of the one or more constrained pairs; and
  inserting the training data into an item ranking model configured to rank one or more items of the plurality of items related to the particular item.

7. The system of claim 1, wherein:
  an input for the two-branch Siamese CNN model comprises the pair of digital images from the plurality of digital images;
  an output of the two-branch Siamese CNN model comprises the number indicating the similarity of the pair of digital images;
  the plurality of layers of each branch of the two-branch Siamese CNN model comprise, in order of application to the input: a first convolutional layer, a first maximum pool layer, a first normalization layer, a second convolutional layer, a second maximum pool layer, a second normalization layer, a third convolutional layer, a fourth convolutional layer, a fifth convolutional layer, a first fully connected layer, a second fully connected layer, a third fully connected layer, a dropout layer, a rectified linear unit layer, and a fourth fully connected layer;
  the first set of rules for determining the contrastive loss of each pair of the plurality of pairs of digital images comprise:

$$L(\theta) = \Sigma_{(x_p, x_q)} L_2(x_p, x_q)^2 + \Sigma_{(x_m, x_n)} (\text{margin} - L_2(x_m, x_n))^2$$

where $L(\theta)$ is the contrastive loss, $\Sigma_{(x_p, x_q)} L_2(x_p, x_q)^2$ is a first penalty for one or more first pairs of digital images $x_p$ and $x_q$ of the plurality of pairs of digital images labeled as similar but determined by the two-branch Siamese CNN model to be dissimilar, $\Sigma_{(x_m, x_n)} (\text{margin} - L_2(x_m, x_n))^2$ is a second penalty for one or more second pairs of digital images $x_m$ and $x_n$ of the plurality of digital images labeled as dissimilar but determined by the two-branch Siamese CNN model to be similar, margin is 1, and $L_2$ is a Euclidian distance;
  the one or more non-transitory storage devices storing the computing instructions are further configured to run on the one or more processors and perform acts of:
    combining the similarity between two digital images of the plurality of digital images with one or more content-based features and one or more feedback-based features to determine at least one additional similar item of the plurality of items similar to an additional item of the plurality of items, wherein combining the similarity between two digital images of the plurality of digital images with the one or more content-based features and the one or more feedback-based features comprises:
      indexing each 100-dimensional vector of the plurality of digital images onto an index;
      determining that the 100-dimensional vector of the one or more digital images of the plurality of digital images is within a predetermined distance on the index of the 100-dimensional vector of a digital image of the plurality of digital images associated with a particular item of the plurality of items;
      constraining the particular item with each item of the plurality of items associated with the one or more digital images of the plurality of digital images within the predetermined distance on the index to form one or more constrained pairs;
      accessing additional user session data for a predetermined period of time relating to each of the one or more constrained pairs, the additional user session data comprising the one or more content-based features and the one or more feedback-based features;
      creating training data using the additional user session data for the predetermined period of time relating to each of the one or more constrained pairs; and inserting the training data into an item ranking model configured to rank one or more items of the plurality of items related to the particular item; and coordinating a display of the additional item on the webpage based on a ranking of the at least one additional similar item; and determining, using the two-branch Siamese CNN model and the one or more digital images of the new item, the at least one similar item of the plurality of items to which the new item is most similar comprises:

inputting a duplicate pair of digital images of the new item into the two-branch Siamese CNN model;

transforming each of the duplicate pair of digital images of the new item into a new 100-dimensional vector using the two-branch Siamese CNN model;

comparing the new 100-dimensional vector of the new item to each 100-dimensional vector of the plurality of digital images; and determining the at least one similar item of the plurality of items comprises at least one 100-dimensional vector most similar to the new 100-dimensional vector of the new item.

8. A system comprising:
one or more processors; and
one or more non-transitory storage devices storing computing instructions configured to run on the one or more processors and perform acts of:

accessing an online catalog for an online retailer, the online catalog comprising a plurality of digital images of a plurality of items for sale by the online retailer;

training a two-branch Siamese convolutional neural network (CNN) model, using the plurality of digital images and user session data from a plurality of users of the online catalog, to determine a similarity between two digital images of the plurality of digital images;

receiving one or more digital images of a new item for the online catalog;

determining, using the two-branch Siamese CNN model and the one or more digital images of the new item, at least one similar item of the plurality of items to which the new item is most similar; and coordinating a display of the new item on a webpage based on a ranking of the at least one similar item, wherein:

each branch of the two-branch Siamese CNN model comprises a plurality of layers that transform each digital image of the plurality of digital images into a 100-dimensional vector; and determining, using the two-branch Siamese CNN model and the one or more digital images of the new item, the at least one similar item of the plurality of items to which the new item is most similar comprises:

inputting a duplicate pair of digital images of the new item into the two-branch Siamese CNN model;

transforming each of the duplicate pair of digital images of the new item into a new 100-dimensional vector using the two-branch Siamese CNN model;

comparing the new 100-dimensional vector of the new item to each 100-dimensional vector of the plurality of digital images; and determining the at least one similar item of the plurality of items comprises at least one 100-dimensional vector most similar to the new 100-dimensional vector of the new item.

9. The system of claim 8, wherein:
an input for the two-branch Siamese CNN model comprises the pair of digital images from the plurality of digital images; and
an output of the two-branch Siamese CNN model comprises a number indicating the similarity of the pair of digital images.

10. The system of claim 8, wherein the plurality of layers of each branch of the two-branch Siamese CNN model comprise, in order of application to an input: a first convolutional layer, a first maximum pool layer, a first normalization layer, a second convolutional layer, a second maximum pool layer, a second normalization layer, a third convolutional layer, a fourth convolutional layer, a fifth convolutional layer, a first fully connected layer, a second fully connected layer, a third fully connected layer, a dropout layer, a rectified linear unit layer, and a fourth fully connected layer.

11. A method comprising:
accessing an online catalog for an online retailer, the online catalog comprising a plurality of digital images of a plurality of items for sale by the online retailer;

training a two-branch Siamese convolutional neural network (CNN) model, using the plurality of digital images and user session data from a plurality of users of the online catalog, to determine a similarity between two digital images of the plurality of digital images;

receiving one or more digital images of a new item for the online catalog;

determining, using the two-branch Siamese CNN model and the one or more digital images of the new item, at least one similar item of the plurality of items to which the new item is most similar; and coordinating a display of the new item on a webpage based on a ranking of the at least one similar item, wherein:

each branch of the two-branch Siamese CNN model comprises a plurality of layers that transform each digital image of the plurality of digital images into a 100-dimensional vector; and training the two-branch Siamese CNN model comprises:

inputting a plurality of pairs of digital images of the plurality of digital images into the two-branch Siamese CNN model, each pair of the plurality of pairs of digital images being labeled as similar or dissimilar before being input into the two-branch Siamese CNN model;

determining a distance between the 100-dimensional vector of each digital image of each pair of the plurality of pairs of digital images; and determining a contrastive loss for each pair of the plurality of pairs of digital images using a first set of rules, the contrastive loss comprising a number indicating the similarity of a pair of digital images.

12. The method of claim 11, wherein:
an input for the two-branch Siamese CNN model comprises the pair of digital images from the plurality of digital images; and
an output of the two-branch Siamese CNN model comprises the number indicating the similarity of the pair of digital images.

13. The method of claim 12, wherein the plurality of layers of each branch of the two-branch Siamese CNN model comprise, in order of application to the input: a first convolutional layer, a first maximum pool layer, a first normalization layer, a second convolutional layer, a second maximum pool layer, a second normalization layer, a third convolutional layer, a fourth convolutional layer, a fifth convolutional layer, a first fully connected layer, a second fully connected layer, a third fully connected layer, a dropout layer, a rectified linear unit layer, and a fourth fully connected layer.

14. The method of claim 11, wherein the first set of rules for determining the contrastive loss of each pair of the plurality of pairs of digital images comprise:

$$L(\theta)=\Sigma_{(x_p,x_q)}L_2(x_p,x_q)^2+\Sigma_{(x_m,x_n)}(\text{margin}-L_2(x_m,x_n))^2$$

where $L(\theta)$ is the contrastive loss, $\Sigma_{(x_p, x_q)}L_2(x_p, x_q)^2$ is a first penalty for one or more first pairs of digital images $x_p$ and $x_q$ of the plurality of pairs of digital images labeled as similar but determined by the two-branch Siamese CNN model to be dissimilar, $\Sigma_{(x_m, x_n)}(\text{margin}-L_2(x_m, x_n))^2$ is a second penalty for one or more second pairs of digital images $x_m$ and $x_n$ of the plurality of digital images labeled as dissimilar but determined by the two-branch Siamese CNN model to be similar, margin is 1, and $L_2$ is a Euclidian distance.

15. The method of claim 11, wherein the method further comprises:
  combining the similarity between the two digital images of the plurality of digital images with one or more content-based features and one or more feedback-based features to determine at least one additional similar item of the plurality of items similar to an additional item of the plurality of items; and
  coordinating a display of the additional item on the webpage based on a ranking of the at least one additional similar item.

16. The method of claim 15, wherein combining the similarity between two digital images of the plurality of digital images with the one or more content-based features and the one or more feedback-based features comprises:
  indexing each 100-dimensional vector of the plurality of digital images onto an index;
  determining that the 100-dimensional vector of one or more digital images of the plurality of digital images is within a predetermined distance on the index of the 100-dimensional vector of a digital image of the plurality of digital images associated with a particular item of the plurality of items;
  constraining the particular item with each item of the plurality of items associated with the one or more digital images of the plurality of digital images within the predetermined distance on the index to form one or more constrained pairs;
  accessing additional user session data for a predetermined period of time relating to each of the one or more constrained pairs, the additional user session data comprising the one or more content-based features and the one or more feedback-based features;
  creating training data using the additional user session data for the predetermined period of time relating to each of the one or more constrained pairs; and
  inserting the training data into an item ranking model configured to rank one or more items of the plurality of items related to the particular item.

17. The method of claim 11, wherein:
  an input for the two-branch Siamese CNN model comprises the pair of digital images from the plurality of digital images;
  an output of the two-branch Siamese CNN model comprises the number indicating the similarity of the pair of digital images;
  the plurality of layers of each branch of the two-branch Siamese CNN model comprise, in order of application to the input: a first convolutional layer, a first maximum pool layer, a first normalization layer, a second convolutional layer, a second maximum pool layer, a second normalization layer, a third convolutional layer, a fourth convolutional layer, a fifth convolutional layer, a first fully connected layer, a second fully connected layer, a third fully connected layer, a dropout layer, a rectified linear unit layer, and a fourth fully connected layer;
  the first set of rules for determining the contrastive loss of each pair of the plurality of pairs of digital images comprise:

$$L(\theta)=\Sigma_{(x_p,x_q)}L_2(x_p,x_q)^2+\Sigma_{(x_m,x_n)}(\text{margin}-L_2(x_m,x_n))^2$$

where $L(\theta)$ is the contrastive loss, $\Sigma_{(x_p, x_q)}L_2(x_p, x_q)^2$ is a first penalty for one or more first pairs of digital images $x_p$ and $x_q$ of the plurality of pairs of digital images labeled as similar but determined by the two-branch Siamese CNN model to be dissimilar, $\Sigma_{(x_m, x_n)}(\text{margin}-L_2(x_m, x_n))^2$ is a second penalty for one or more second pairs of digital images $x_m$ and $x_n$ of the plurality of digital images labeled as dissimilar but determined by the two-branch Siamese CNN model to be similar, margin is 1, and $L_2$ is a Euclidian distance;
  the method further comprises:
    combining the similarity between two digital images of the plurality of digital images with one or more content-based features and one or more feedback-based features to determine at least one additional similar item of the plurality of items similar to an additional item of the plurality of items, wherein combining the similarity between two digital images of the plurality of digital images with the one or more content-based features and the one or more feedback-based features comprises:
      indexing each 100-dimensional vector of the plurality of digital images onto an index;
      determining that the 100-dimensional vector of the one or more digital images of the plurality of digital images is within a predetermined distance on the index of the 100-dimensional vector of a digital image of the plurality of digital images associated with a particular item of the plurality of items;
      constraining the particular item with each item of the plurality of items associated with the one or more digital images of the plurality of digital images within the predetermined distance on the index to form one or more constrained pairs;
      accessing the user session data for a predetermined period of time relating to each of the one or more constrained pairs, the user session data comprising the one or more content-based features and the one or more feedback-based features;
      creating training data using the user session data for the predetermined period of time relating to each of the one or more constrained pairs; and inserting the training data into an item ranking model configured to rank one or more items of the plurality of items related to the particular item; and coordinating a display of the additional item on the webpage based on a ranking of the at least one additional similar item; and determining, using the two-branch Siamese CNN model and the one or more digital images of the new item, the at least one similar item of the plurality of items to which the new item is most similar comprises:

inputting a duplicate pair of digital images of the new item into the two-branch Siamese CNN model;

transforming each of the duplicate pair of digital images of the new item into a new 100-dimensional vector using the two-branch Siamese CNN model;

comparing the new 100-dimensional vector of the new item to each 100-dimensional vector of the plurality of digital images; and determining the at least one similar item of the plurality of items comprises at least one 100-dimensional vector most similar to the new 100-dimensional vector of the new item.

18. A method comprising:

accessing an online catalog for an online retailer, the online catalog comprising a plurality of digital images of a plurality of items for sale by the online retailer;

training a two-branch Siamese convolutional neural network (CNN) model, using the plurality of digital images and user session data from a plurality of users of the online catalog, to determine a similarity between two digital images of the plurality of digital images;

receiving one or more digital images of a new item for the online catalog;

determining, using the two-branch Siamese CNN model and the one or more digital images of the new item, at least one similar item of the plurality of items to which the new item is most similar; and coordinating a display of the new item on a webpage based on a ranking of the at least one similar item, wherein:

each branch of the two-branch Siamese CNN model comprises a plurality of layers that transform each digital image of the plurality of digital images into a 100-dimensional vector; and determining, using the two-branch Siamese CNN model and the one or more digital images of the new item, the at least one similar item of the plurality of items to which the new item is most similar comprises:

inputting a duplicate pair of digital images of the new item into the two-branch Siamese CNN model;

transforming each of the duplicate pair of digital images of the new item into a new 100-dimensional vector using the two-branch Siamese CNN model;

comparing the new 100-dimensional vector of the new item to each 100-dimensional vector of the plurality of digital images; and determining the at least one similar item of the plurality of items comprises at least one 100-dimensional vector most similar to the new 100-dimensional vector of the new item.

19. The method of claim 18, wherein:

an input for the two-branch Siamese CNN model comprises the pair of digital images from the plurality of digital images; and an output of the two-branch Siamese CNN model comprises a number indicating the similarity of the pair of digital images.

20. The method of claim 18, wherein the plurality of layers of each branch of the two-branch Siamese CNN model comprise, in order of application to an input: a first convolutional layer, a first maximum pool layer, a first normalization layer, a second convolutional layer, a second maximum pool layer, a second normalization layer, a third convolutional layer, a fourth convolutional layer, a fifth convolutional layer, a first fully connected layer, a second fully connected layer, a third fully connected layer, a dropout layer, a rectified linear unit layer, and a fourth fully connected layer.

* * * * *